United States Patent
Kumar et al.

(10) Patent No.: US 7,814,405 B2
(45) Date of Patent: Oct. 12, 2010

(54) METHOD AND SYSTEM FOR AUTOMATIC GENERATION AND UPDATING OF TAGS BASED ON TYPE OF COMMUNICATION AND CONTENT STATE IN AN ACTIVITIES ORIENTED COLLABORATION TOOL

(75) Inventors: Shruti Kumar, Littleton, MA (US); Latoya Sankey, Maiden, MA (US)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 11/564,285

(22) Filed: Nov. 28, 2006

(65) Prior Publication Data

US 2008/0126990 A1      May 29, 2008

(51) Int. Cl.
*G06F 17/00* (2006.01)
(52) U.S. Cl. .................................... 715/201; 715/209
(58) Field of Classification Search ................. 715/234, 715/201, 203, 209, 255; 705/500
See application file for complete search history.

(56) References Cited

U.S. PATENT DOCUMENTS

| | | | |
|---|---|---|---|
| 6,463,461 B1* | 10/2002 | Hanson et al. | 709/204 |
| 7,099,846 B1* | 8/2006 | Ishibashi et al. | 705/51 |
| 7,103,886 B2* | 9/2006 | Haller et al. | 718/100 |
| 7,143,342 B1* | 11/2006 | Baweja et al. | 715/207 |
| 2002/0018078 A1 | 2/2002 | Khan et al. | |
| 2002/0026529 A1 | 2/2002 | Sugahara | |
| 2002/0186257 A1* | 12/2002 | Cadiz et al. | 345/838 |
| 2003/0033434 A1* | 2/2003 | Kavacheri et al. | 709/246 |

(Continued)

OTHER PUBLICATIONS

Buscher, Monika, et al, "Collaborative Augmented Reality Environments: Integrating VR, Working Materials, and Distributed Work Spaces", CVE '00: Proceedings of the Third International Conference on Collaborative Virtual Environments, Sep. 2000, pp. 47-56.*

(Continued)

*Primary Examiner*—Laurie Ries
(74) *Attorney, Agent, or Firm*—David A. Dagg (57) ABSTRACT

A system for automatic generation and updating of tags based on type of communication and content state in an activities oriented collaboration tool. Content type tags are automatically generated for content items received from different content sources and aggregated into an activities based collaboration tool. The automatically generated content type tags are associated with content items stored in the activities based collaboration tool. The automatically generated content type tags also provide indications of states associated with the content items they are associated with in the activities tool. As the state of content items change over time, the disclosed system detects those state changes and automatically updates the associated content type tags to indicate the state changes. A top level content type tags view lists all automatically generated content type tags across all activities. The top level content type tags view enables a user to select from the content type tags available across all activities, to cause all content items to be displayed that are associated with the selected content type tag, across all activities. An activity level type tags view lists all automatically generated content type tags associated with content items contained in a currently open activity, and enables a user to select from the content type tags available within the currently opened activity, to cause all content items associated with the selected content type tag, and contained within the currently opened activity, to be displayed.

15 Claims, 8 Drawing Sheets

U.S. PATENT DOCUMENTS

| | | | |
|---|---|---|---|
| 2003/0065721 A1* | 4/2003 | Roskind | 709/204 |
| 2003/0083882 A1* | 5/2003 | Schemers, III et al. | 704/270.1 |
| 2003/0182310 A1* | 9/2003 | Charnock et al. | 707/104.1 |
| 2005/0198125 A1* | 9/2005 | Macleod Beck et al. | 709/204 |
| 2005/0235034 A1 | 10/2005 | Chen et al. | |
| 2005/0283734 A1 | 12/2005 | Santoro et al. | |
| 2006/0036696 A1 | 2/2006 | Maresh | |
| 2006/0059024 A1* | 3/2006 | Bailey et al. | 705/5 |
| 2006/0168510 A1 | 7/2006 | Bryar et al. | |
| 2006/0277191 A1* | 12/2006 | Badovinatz et al. | 707/10 |
| 2007/0038711 A1* | 2/2007 | MacBeth et al. | 709/206 |
| 2009/0070200 A1* | 3/2009 | August | 705/10 |

OTHER PUBLICATIONS http://wiki.mozilla.org/User:Dria/On_Tagging.

* cited by examiner

METHOD AND SYSTEM FOR AUTOMATIC GENERATION AND UPDATING OF TAGS BASED ON TYPE OF COMMUNICATION AND CONTENT STATE IN AN ACTIVITIES ORIENTED COLLABORATION TOOL

FIELD OF THE INVENTION

The present invention relates generally to collaboration software tools, and more specifically to a method and system for automatic generation and updating of tags based on type of communication and content state in an activities oriented collaboration tool.

BACKGROUND OF THE INVENTION

Today's computer user often has to access and use information from different sources, and of different types. Moreover, in order to accomplish a given task, different types of information from different sources much often be used. As a result, in the past, users have been forced to move between different computer applications that are associated with the different types of information needed for each task. To address this problem, an "activities oriented" tool would be desirable to bring together information from multiple, different sources for private or shared viewing, editing and organization. Such a tool should allow aggregation of various different types of content related to an activity, where the types of aggregated content may include files, messages, instant messaging sessions ("chats"), and/or any other specific type of content. The tool should further allow users to belong to an activity, with activity membership providing access and/or other privileges with regard to the content associated with the activity.

When using an activities oriented collaboration tool, in certain circumstances it may be desirable to be able to categorize information within the tool, not only based on content, but also based on the type of content. For example, a user responsible for planning events may create a "Tech Show" activity related to planning a technical show. During the planning of the technical show, various meetings may occur, and a large number of communications performed, for example via Web conference, telephone, e-mail and/or instant messaging, each with corresponding content saved into the "Tech Show" activity in the activities tool. At a certain point in time, a user with access to the "Tech Show" activity may want to view all the saved voicemails in that activity to make sure they have been answered. Since there are a large number of communications in the activity, it may be difficult to conveniently locate all the voicemails among the other content types in the activity. In addition, if there are a large number of voicemails stored in the activity, it could become burdensome to quickly determine which voicemails have been answered, and which are unanswered.

Tagging has been used in some existing systems to allow users to identify related content. Some existing systems have allowed users to attach keyword descriptions (called tags) to images or text to serve as categories or topics. Well known examples include del.icio.us, www.gmail.com, and www.flickr.com. In addition, some existing systems have performed automatic tagging based on content stored in the application, and/or keywords contained in the content. However, existing automatic tagging systems typically operate across a single type of content, and none have provided automatic generation and/or updating of tags based on content type.

Accordingly, for the above reasons and others, it would be desirable to have a new system for organizing content within an activities collaboration tool, that enables users to conveniently access content in the activities tool based on content type, and that automatically updates content types based on the state of content stored in the activities tool.

SUMMARY OF THE INVENTION

To address the above described and other shortcomings of previous systems, a new method and system are disclosed for automatic generation and updating of tags based on type of communication and content state in an activities oriented collaboration tool. Content type tags are automatically generated for content items received from different content sources and aggregated into an activities based collaboration tool. The automatically generated content type tags are associated with content items stored in the activities based collaboration tool. The automatically generated content type tags also provide indications of states associated with the content items they are associated with in the activities tool. As the state of content items change over time, the disclosed system detects those state changes and automatically updates the associated content type tags to indicate the state changes.

The disclosed system also provides convenient ways of viewing the content items contained within the activities based collaboration tool. A top level content type tags view lists all automatically generated content type tags across all activities. The top level content type tags view enables a user to select from the content type tags available across all activities. In response to a user selecting one of the content type tags available across all activities, the disclosed system operates to list or otherwise display all content items across all activities that are associated with the selected content type tag. An activity level content type tags view lists all the automatically generated content type tags associated with content items contained within a single activity. The activity level content type tags view enables a user to select from the content type tags available within that activity. In response to the user selecting one of the content type tags available within an activity, the disclosed system operates to list or otherwise display all content items within the activity that are associated with the selected content type tag.

Thus there is disclosed a new system for organizing content within an activities collaboration tool, that enables users to conveniently access content in the activities tool based on automatically generated content type tags, and that automatically updates content type tags based on the state of content item entries in the activities tool.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION OF EXEMPLARY EMBODIMENTS

Figure 1:
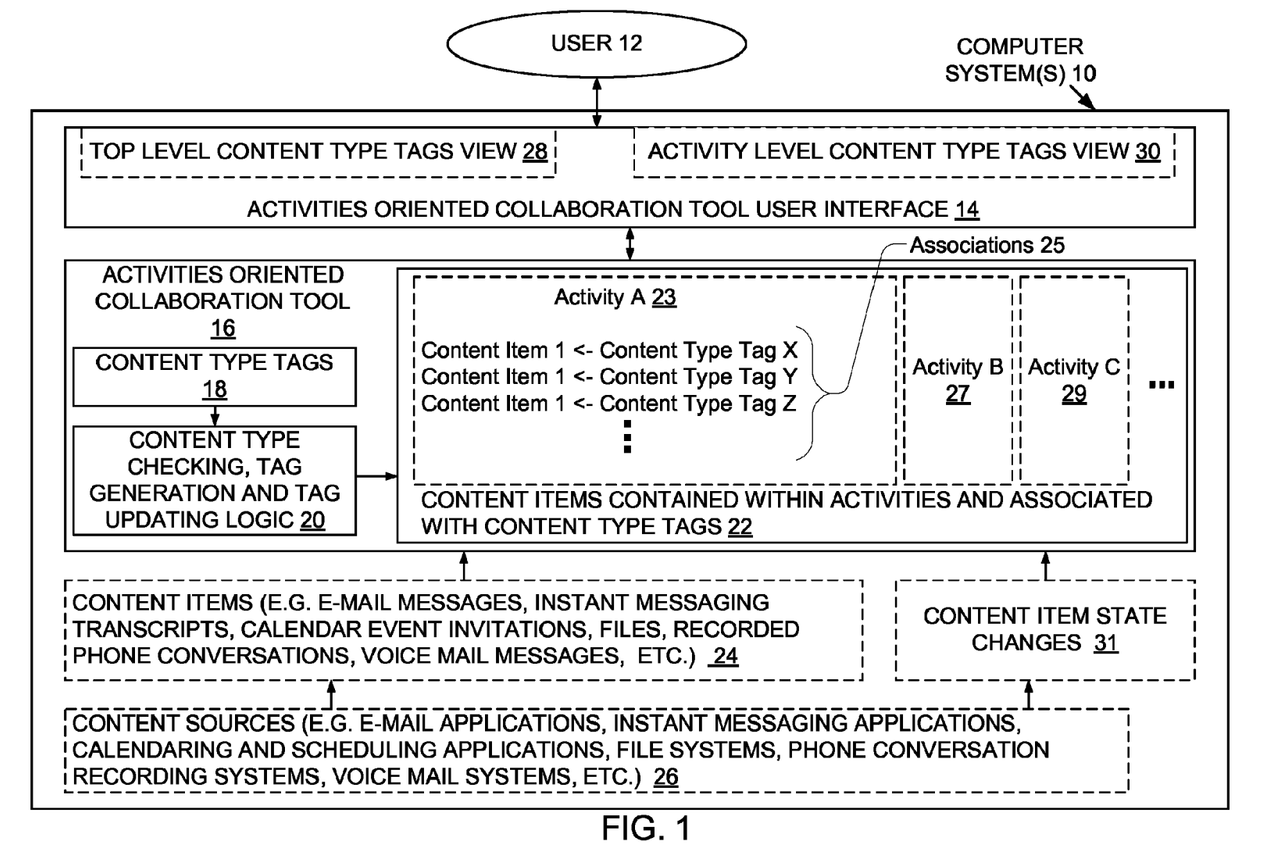
FIG. 1 is a block diagram showing software and/or hardware components in an illustrative embodiment of the disclosed system.

FIG. 1 is a block diagram showing software and/or hardware components in an illustrative embodiment of the disclosed system. As shown in FIG. 1, computer system(s) 10 provides an activities oriented collaboration tool user interface 14 to a user 12. The activities oriented collaboration tool user interface 14 is provided by software executing on the computer system(s) 10, shown as the activities oriented collaboration tool 16. In the illustrative embodiment of FIG. 1, the activities oriented collaboration tool 16 is application software executing on the computer system(s) 10. However, while in FIG. 1 the activity oriented collaboration tool 16 is shown as a stand alone application executing completely on a single computer system, the activities oriented collaboration tool 16 may alternatively be embodied in a client-server model, with portions executing on a client computer system and other portions executing on one or more server computer systems. The activities oriented collaboration tool 16 may be embodied in another alternative embodiment as a Web application, provided through a Web browser program executing on the computer system(s) 10.

The activities oriented collaboration tool user interface 14 may be embodied as any specific type of user interface, such as, for example, a graphical user interface, and may be navigated by the user 12 through any specific type of user interface device, such as a computer keyboard or mouse, and/or using voice commands or the like.

The computer system(s) 10 may be embodied as a single computer system, or as multiple computer systems that are communicably connected. The computer system(s) 10 may, for example, consist of at least one processor, program storage, such as memory, for storing program code executable on the processor, one or more input/output devices and/or interfaces, such as data communication and/or peripheral devices and/or interfaces, and may further include appropriate operating system software. The computer system(s) 10 may be any specific type of computer system or electronic device operable to provide the user interface 14, such as, for example, a desktop or laptop computer systems, PDA (Personal Digital Assistant), cell phone, tablet PC, or any other appropriate type of device.

During operation of the illustrative embodiment shown in FIG. 1, multiple content sources 26 provide content items 24 to the activities oriented collaboration tool 16. The content sources 26 may include any specific type of content source, such as e-mail applications, instant messaging applications, calendaring and scheduling applications, file systems, phone conversation recording systems, voice mail systems, and/or other content sources. The content sources 26 may further include multiple sources of the same content source type, e.g. two or more e-mail applications or accounts associated with the user 12, two or more instant messaging applications or accounts associated with the user 12, etc.

The content items 24 may include any specific type of content item, such as e-mail messages, instant messaging session transcripts, calendar event invitation messages, files, recorded phone conversations, voice mail messages, and/or other content items.

During operation of the illustrative embodiment shown in FIG. 1, for each of the received content items 24, the user 12 indicates one or more activities defined within the activities oriented collaboration tool 16 with which the content item is to be associated. As a result, each of the received content items 24 is logically contained within at least one activity in the activity oriented collaboration tool 16. The content items 24 received by the activities oriented collaboration tool 16 are shown as the content items 22 in FIG. 1. Content items of different types, from different ones of the content sources 26, may all be contained within the same activity. For example, multiple e-mail messages, instant messaging transcripts, and voice mail messages may all be contained within a single activity defined in the activities oriented collaboration tool 16.

Further during operation of the illustrative embodiment shown in FIG. 1, as each of the content items 24 are received by the activities oriented collaboration tool 16, they are examined by the content type checking, tag generation and tag updating program logic 20. For each of the received content items 14, the program logic 20 determines whether there is a matching content type tag in content type tags 18. For example, if a content item consisting of an e-mail message were received, the program logic 20 would determine if there exists a content type tag in the content type tags 18 that is to be associated with e-mail messages. If so, then the program logic 20 would associate that content type tag with the content item in the activity containing that content item in the activities oriented collaboration tool 16. Similarly, if a content item consisting of a voice mail message were received, the program logic would determine if there exists a content type tag in the content type tags 18 that is to be associated with voice mail messages. If so, then the program logic 20 would associate that content type tag with the content item in the activity containing that content item in the activities oriented collaboration tool 16.

As shown in FIG. 1, the activities oriented collaboration tool 16 may include multiple activities, illustrated by activity A 23, activity B 27, activity C 29, etc. The activities in the activities oriented collaboration tool 16 provide associations between content items and content type tags. For example, activity A 23 is shown including associations 25 between content items contained in that activity and individual content type tags from the content type tags 18. The associations 25 are shown including an association between a content item 1 and a content type tag X, and association between a content item 2 and a content type tag Y, an association between a content item 3 and a content type tag Z, and so on.

Each of the content type tags 18 also includes an indication of content item state. Accordingly, when a content item is received by the activities oriented collaboration tool 16, the program logic 20 assigns a content type tag to that content item that reflects the initial state of that content item when it was received. For example, when an e-mail message is initially received by the collaboration tool 16, the program logic 20 would assign a content type tag indicating both that the content item is an e-mail message, and also that the e-mail message has not yet been read by the user 12 (if in fact that is the initial state of the e-mail message). Similarly, when a voice mail message is initially received by the collaboration tool 16, if that voice mail message has not yet been listened to by the user 12, then the program logic 20 would assign a content type tag indicating that the content item is a voice mail message, and also that the voice mail message has not yet been listened to by the user 12.

The program logic 20 further operates to detect content item state changes 31, which may, for example, be determined from the content sources 26. The program logic 20 operates to update the content type tags associated with corresponding ones of the content item entries 22 in response to the content item state changes 31. For example, if the user 12 listens to a voice mail message content item contained in one of the activities in the activities oriented collaboration tool 16, the program logic 20 operates to update the content type tag associated with the voice mail message content entry to indicate that the user 12 has listened to that voice mail message. Similarly, if the user reads an e-mail message content item contained in one of the activities in the activities oriented collaboration tool 16, the program logic 20 operates to update the content type tag for that content item to indicate that the user 12 has read the e-mail message. Other examples of content type tags and of events causing content type tags to be changed to reflect new content item states are described below.

In one embodiment of the disclosed system, an administrator user has permission to define or modify the content type tags 18, while the user 12 cannot. In such an embodiment, the user also does not have the option to delete or edit the content type tags 18. Some examples of content type tags are given in the following table:

| CONTENT ITEM | INITIAL CONTENT TYPE TAG | UPDATED CONTENT TYPE TAG BASED ON CONTENT ITEM STATE CHANGE |
|---|---|---|
| Telephone conversations | "phone conversation" | |
| Voicemail | "voicemail" | "voicemail:answered" |
| Video conference | "video conference" | "video conference: started", "video conference: over" |
| Electronic meeting | "meeting invite" | "meeting:accepted", "meeting:decline", "meeting:attended" |
| E-mail | "emails" | "emails: responded" |
| Chat | "chat" | |
| Documents | "textfile", "spreadsheetfile", "presentationfile" . . . etc | "textfile: updated" |

Further during operation of the embodiment shown in FIG. 1, as part of the activities tool user interface 14, the activities oriented collaboration tool 16 provides a top level content type tags view 28, and an activity level content type tags view 30. The top level content type tags view 28 lists all automatically generated content type tags that are available (e.g. all of the content type tags 18). The top level content type tags view 28 enables a user to select from the content type tags available across all activities, for example by clicking on a content type tag from within a list or menu. In response to a user selecting one of the content type tags displayed in the top level content type tags view 28, in a first embodiment, the collaboration tool 16 operates to display all those content item entries 22 across all activities that are associated with the selected content type tag. In an alternative embodiment, in response to a user selecting one of the content type tags displayed in the top level content type tags view 28, the collaboration tool 16 operates to display all those activities that include at least one content item associated with the selected content type tag.

The activity level content type tags view 30 lists all the content type tags associated with content items contained within a selected or "open" activity. The activity level content type tags view enables a user to select from those of content type tags 18 that are available within the currently open activity, in order to display only those content entries within the activity that are associated with the selected content type tag. For example, the content type tags 18 that are available within a currently open activity may consist of those content type tags that have previously been assigned to at least one of the content items in that activity. In response to the user selecting one of the content type tags available within the currently open activity, the collaboration tool 16 operates to display only those content items that are contained within the currently open activity and that are associated with the selected content type tag.

Figure 2:
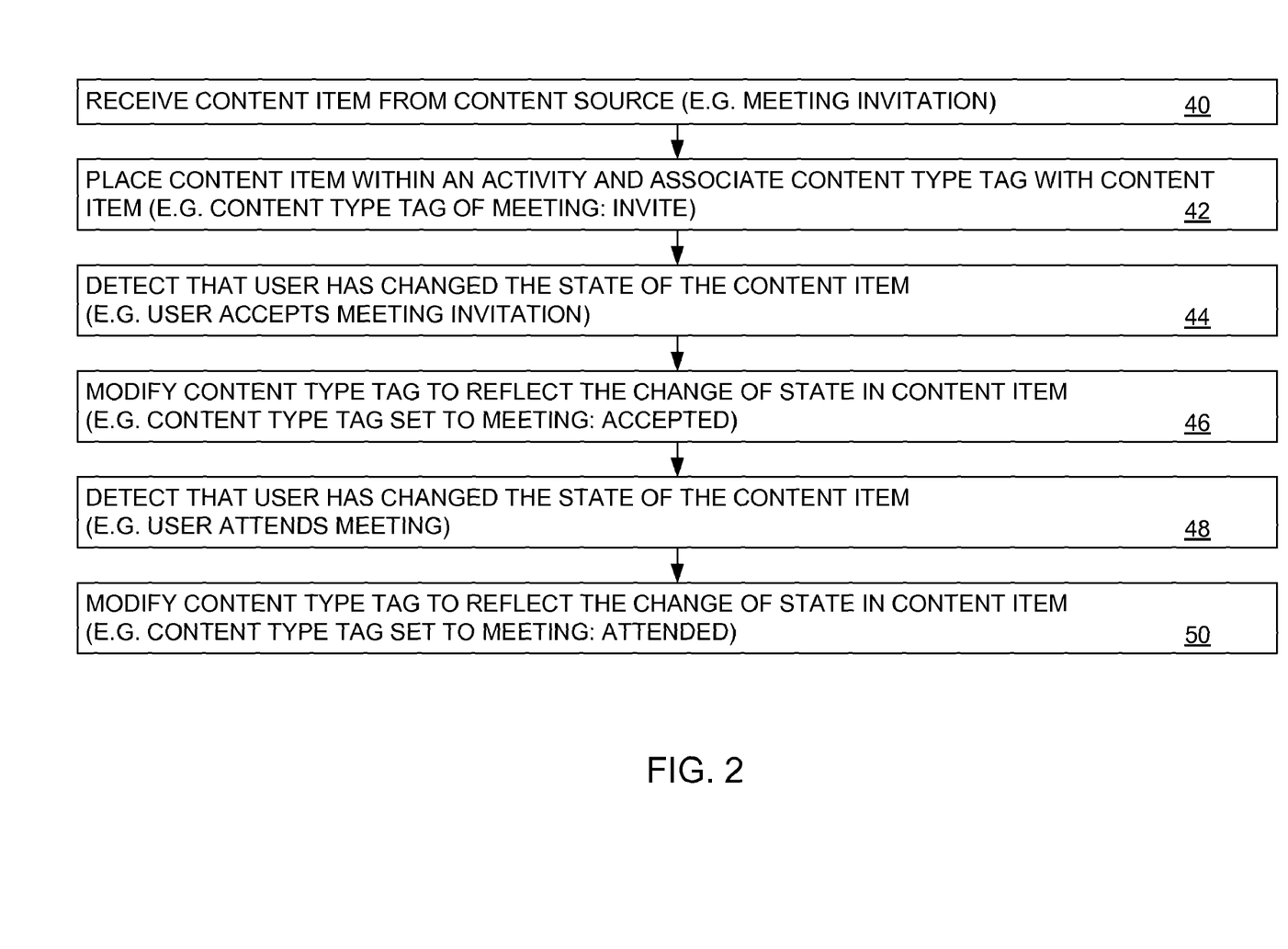
FIG. 2 is a flow chart of steps performed to generate and update a content type tag in an illustrative embodiment of the disclosed system.

FIG. 2 is a flow chart of steps performed to generate and update a content type tag in an illustrative embodiment of the disclosed system. The steps of FIG. 2 may, for example, be performed through execution of the content type checking, tag generation and tag updating logic 20. At step 40, the disclosed system receives a content item from a content source, such as an electronic meeting invitation. For example, an electronic meeting invitation received at step 40 might indicate a time of a meeting, a meeting topic, and a list of attendees for that meeting, and may be received as an e-mail message or the like.

At step 42, the disclosed system stores at least a representation of and/or pointer to the received content item within an activity in the activity oriented collaboration tool. The disclosed system also associates the received content item with a content type tag. For example, where the content item received at step 40 is an electronic meeting invitation with a subject of "Resource planning for the upcoming tech show", a user might indicate that the content item is to be associated with a "Tech Show" activity defined within the collaboration tool. The disclosed system would also operate to associate a content type tag with the content item in the collaboration tool. In the case of a received electronic meeting invitation, such a content type tag might consist of "MEETING:INVITE" or the like.

At step 44, the disclosed system detects an event that changes the state of the content item received at step 40. For example, the disclosed system may detect that the user has accepted the meeting invitation received at step 40. In response to the detection of the event at step 44, at step 46 the disclosed system modifies the content type tag for the content item received at step 40, in order to reflect the change in state for that content item. For example, if the disclosed system detected that the user had accepted the meeting invitation received at step 40 at step 44, then the disclosed system would operate at step 46 to change the content type tag for that content item to reflect the changed state. The updated content type flag might, for example, consist of "MEETING:ACCEPTED", or the like.

At step 48, the disclosed system again detects that an event has occurred that changes the state of a content item. For example, the disclosed system may detect at step 48 that the user has attended the meeting for which they received a meeting invitation at step 40. In response to detecting such an event, the disclosed system again changes the content type tag for that content item to reflect the new state at step 50. For example, the updated content type tag generated by the disclosed system at step 50 might consist of "MEETING:ATTENDED", or the like.

While for purposes of concise illustration only two content item state changes are processed in the example flow of steps shown in FIG. 2, the disclosed system operates such that any specific number of state changes may be detected and result in updates to corresponding content type tags.

Figure 3:
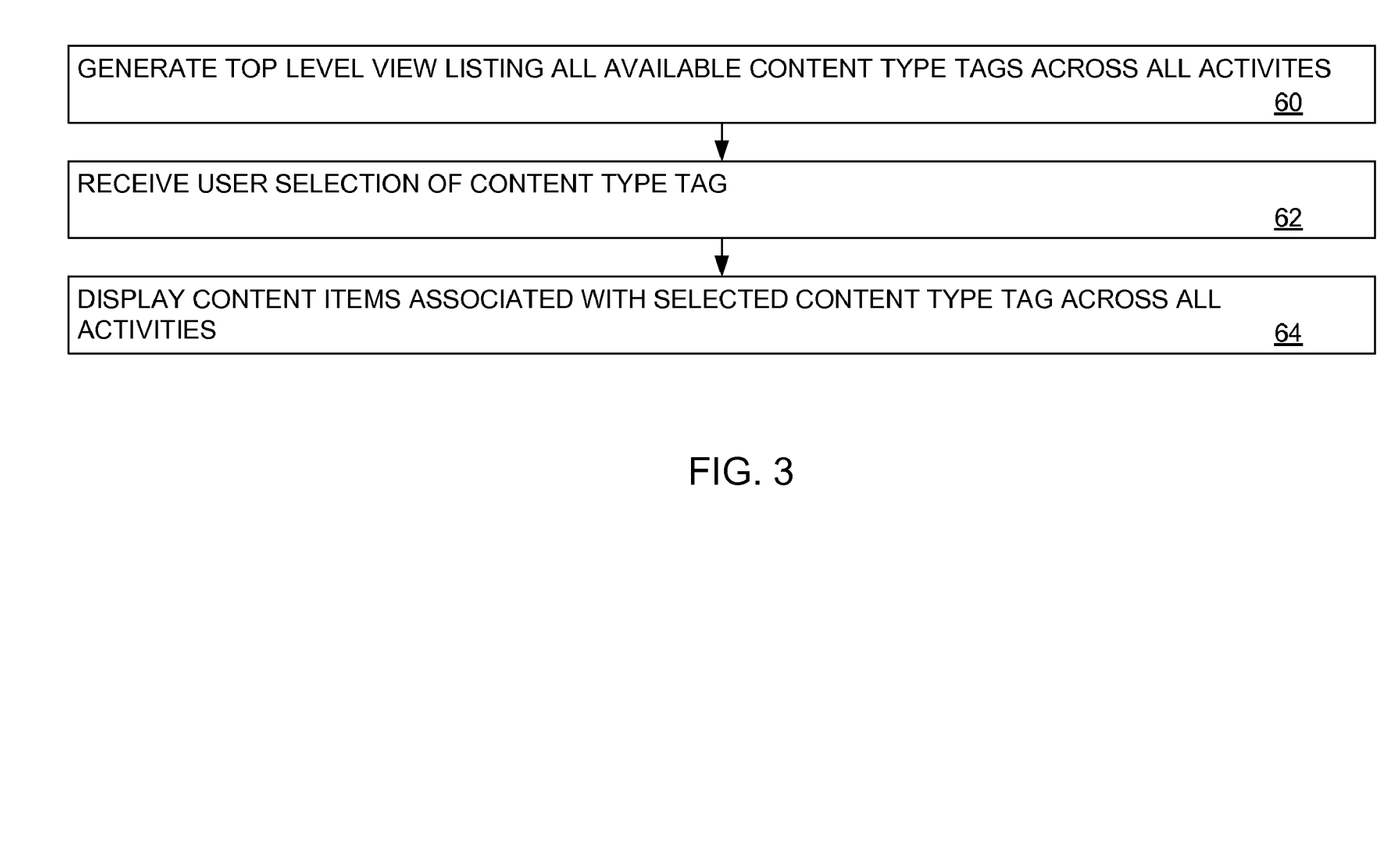
FIG. 3 is a flow chart of steps performed to provide a top level view user interface in an illustrative embodiment of the disclosed system.

FIG. 3 is a flow chart of steps performed to provide a top level view user interface in an illustrative embodiment of the disclosed system. The steps of FIG. 3 may, for example, be performed through execution of the activities oriented collaboration tool 16 in generating the top level content type tags view 28 within the activities tool user interface 14 of FIG. 1.

At step 60, the disclosed system generates a top level view listing all available content type tags across all activities. The content type tags listed through the top level view at step 60 may, for example, consist of all those content type tags contained in the content type tags 18 shown in FIG. 1, or of all content type tags associated with at least one content item contained in any activity within the activities oriented collaboration tool. The listing of content type tags provided at step 60 may be represented using any specific type of display object allowing selection by the user of individual content type tags, such as, for example, a content type tag list, a drop-down menu, button display objects, and/or other appropriate types of display objects for a specific embodiment.

At step 62, the disclosed system receives a user selection of one of the content type tags displayed at step 60. For example, the disclosed system may detect that the user has clicked on or otherwise selected a display object representation of a content type tag displayed at step 60. At step 64, the disclosed system displays content item entries associated with the content type tag selected at step 62. Alternatively, at step 64, the disclosed system may display activities containing at least one content item associated with the content type tag selected at step 62. Content item entries displayed at step 64 are contained across all activities defined in the activity oriented collaboration tool. Accordingly, the content item entries displayed at step 64 are across multiple different activities.

Figure 4:
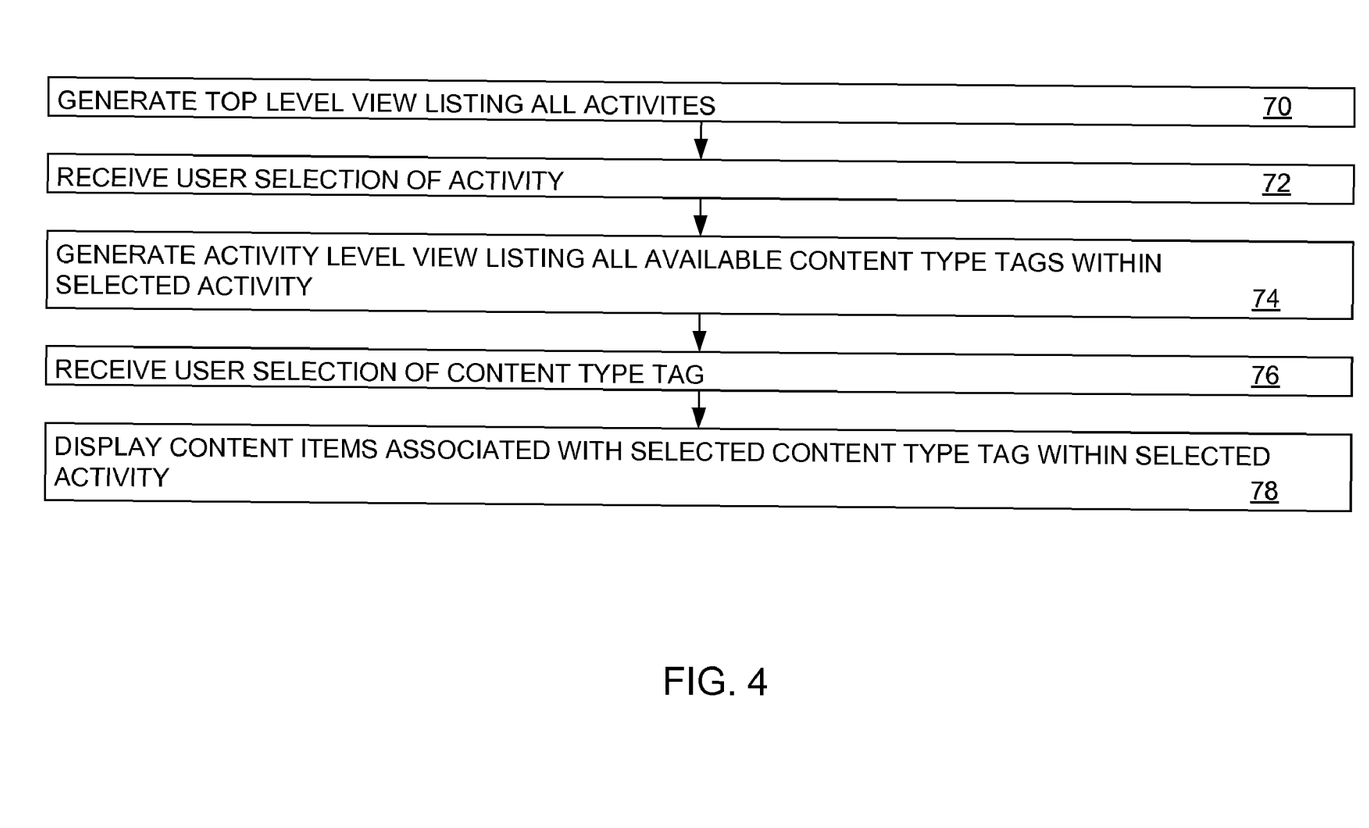
FIG. 4 is a flow chart of steps performed to provide an activity level view user interface in an illustrative embodiment of the disclosed system.

FIG. 4 is a flow chart of steps performed to provide an activity level view user interface in an illustrative embodiment of the disclosed system. The steps of FIG. 4 may, for example, be performed through execution of the activities oriented collaboration tool 16 while generating the activity level content type tags view 30 within the activities tool user interface 14 of FIG. 1.

At step 70, the disclosed system generates a top level view listing all activities defined within the activities oriented collaboration tool. The listing of activities provided at step 70 may be visually represented to the user through any specific type of display object allowing selection by the user of individual activities, such as, for example, an activities list, a drop-down menu, button display objects, and/or other specific types of display objects as may be appropriate for a specific embodiment.

At step 72, the disclosed system receives a user selection of one of the activities displayed at step 70. For example, the disclosed system may detect that the user has clicked on or otherwise selected a display object representation of an activity displayed at step 70. At step 74, the disclosed system displays content type tags available within the activity selected at step 72. The content type tags displayed at step 74 are those of the content type tags 18 (FIG. 1) that have been associated by the disclosed system with one or more content item entries contained within the activity selected at step 72. The content type tags displayed at step 74 may be visually displayed through any specific type of display object allowing selection by the user of content type tags, such as, for example, a content type tags list, a drop-down menu, button display objects, and/or other types of display objects.

At step 76, the disclosed system receives a user selection of one of the content type tags displayed at step 74. For example, the disclosed system may detect that the user has clicked on or otherwise selected a display object representation of a content type tag displayed at step 74. At step 78, the disclosed system displays those content item entries contained within the activity selected at step 72, and associated by the disclosed system with the content type tag selected at step 76. Accordingly, the content item entries displayed at step 78 are only those content item entries that are both associated with the content type tag selected at step 76, and contained within the activity selected at step 72. For example, a user may wish to find all voice mails contained within an activity. Using the disclosed system, the user could select a "voicemail" content type tag or the like at step 76 while the desired activity is open. As a result, at step 78 all voice mails contained within the currently open activity would be displayed. Similarly, the user could easily find all answered voicemails, simply be selecting the content type tag "voicemail:answered" or the like at step 76, causing only the answered voicemails contained within the currently open activity to be displayed at step 78.

Figure 5:
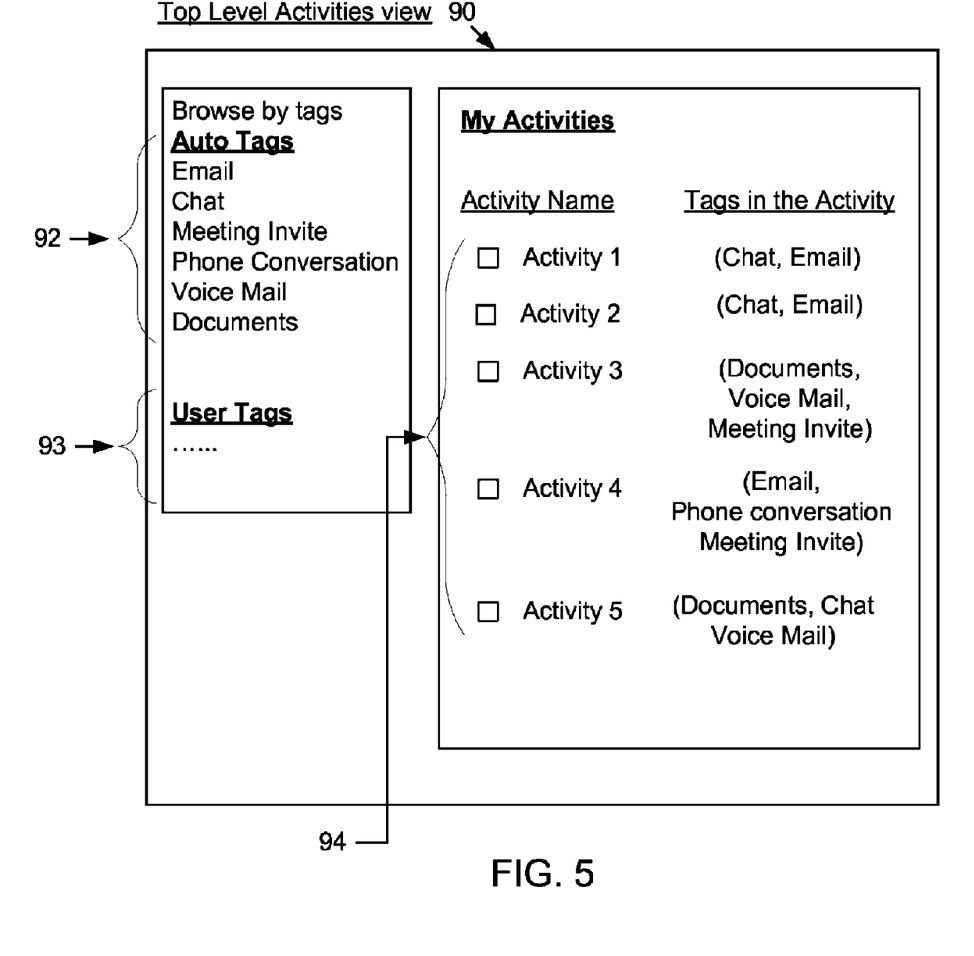
FIG. 5 is a simplified screen shot showing an example of a top level activities view user interface provided by an illustrative embodiment of the disclosed system.

FIG. 5 is a simplified screen shot showing an example of a top level activities view user interface 90 provided by an illustrative embodiment of the disclosed system. As shown in FIG. 5, the top level activities view user interface 90 includes a list 92 of all content type tags associated by the disclosed system with any content items in any activities. A list of user defined tags 93 is also shown in FIG. 5, which may display user defined tags that are associated by a user with content items. In the example of FIG. 5, the user has configured the disclosed system so that the content type tags 94 that are automatically associated with received content items are displayed separately from user defined tags 93, which may in some cases assist the user in finding a desired content type and/or user defined tag.

An activities list 94 lists all activities defined within the activities oriented collaboration tool. Adjacent to each of the activities listed in the activities list 94 is the set of tags associated with content items contained in that activity. For example, the set of tags associated with content items contained in activity 1 consists of the "Chat" and "Email" tags, the set of tags associated with content items contained in activity 2 is the same, the set of tags associated with content items contained in activity 3 consists of "Documents", "Voice Mail", and "Meeting Invite", and so on.

Figure 6:
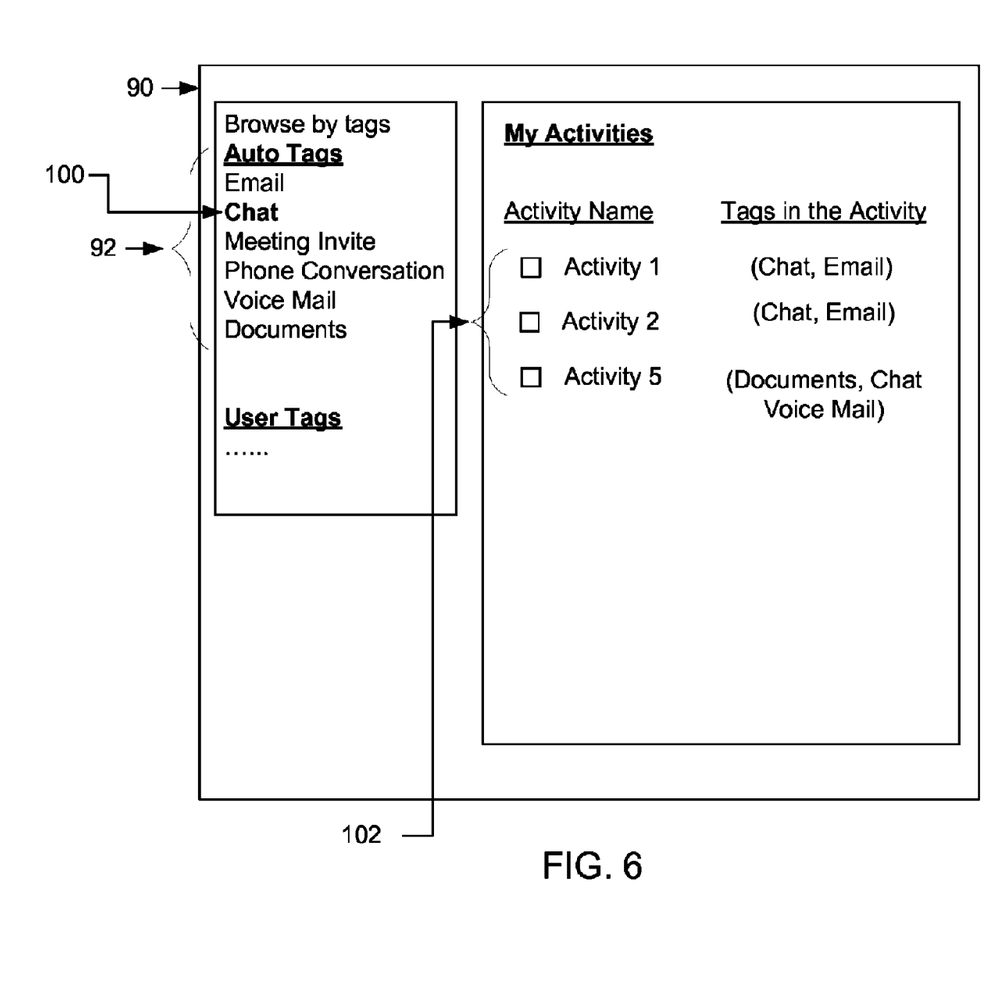
FIG. 6 is a simplified screen shot showing the top level activities view user interface of FIG. 5 after a user has selected a content type tag.

FIG. 6 is a simplified screen shot showing the top level activities view user interface 90 of FIG. 5 after a user has selected the content type tag "Chat" 100 from within the list of content type tags 92. As a result of the user selecting the content type tag "Chat" 100, the disclosed system has generated a modified list 102 of activities, where the modified list 102 only displays those activities that contain content items associated with the selected content type tag "Chat" 100. Accordingly, only activities 1, 2 and 3 are displayed in the modified list 102, since those activities are the only activities that contain content items associated with the selected content type tag "Chat" 100. In this way the user has caused the disclosed system to list all those activities defined within the activities oriented collaboration tool that contain chat (instant messaging) transcripts.

Alternatively, the disclosed system may be embodied to display indications of all the content items associated with the content type tag "Chat" 100, across all defined activities, in response to the user selecting the content type tag "Chat" 100. In this way the user could cause the disclosed system to display all chat (instant messaging) transcripts contained in any activity defined within the activity oriented collaboration tool.

Figure 7:
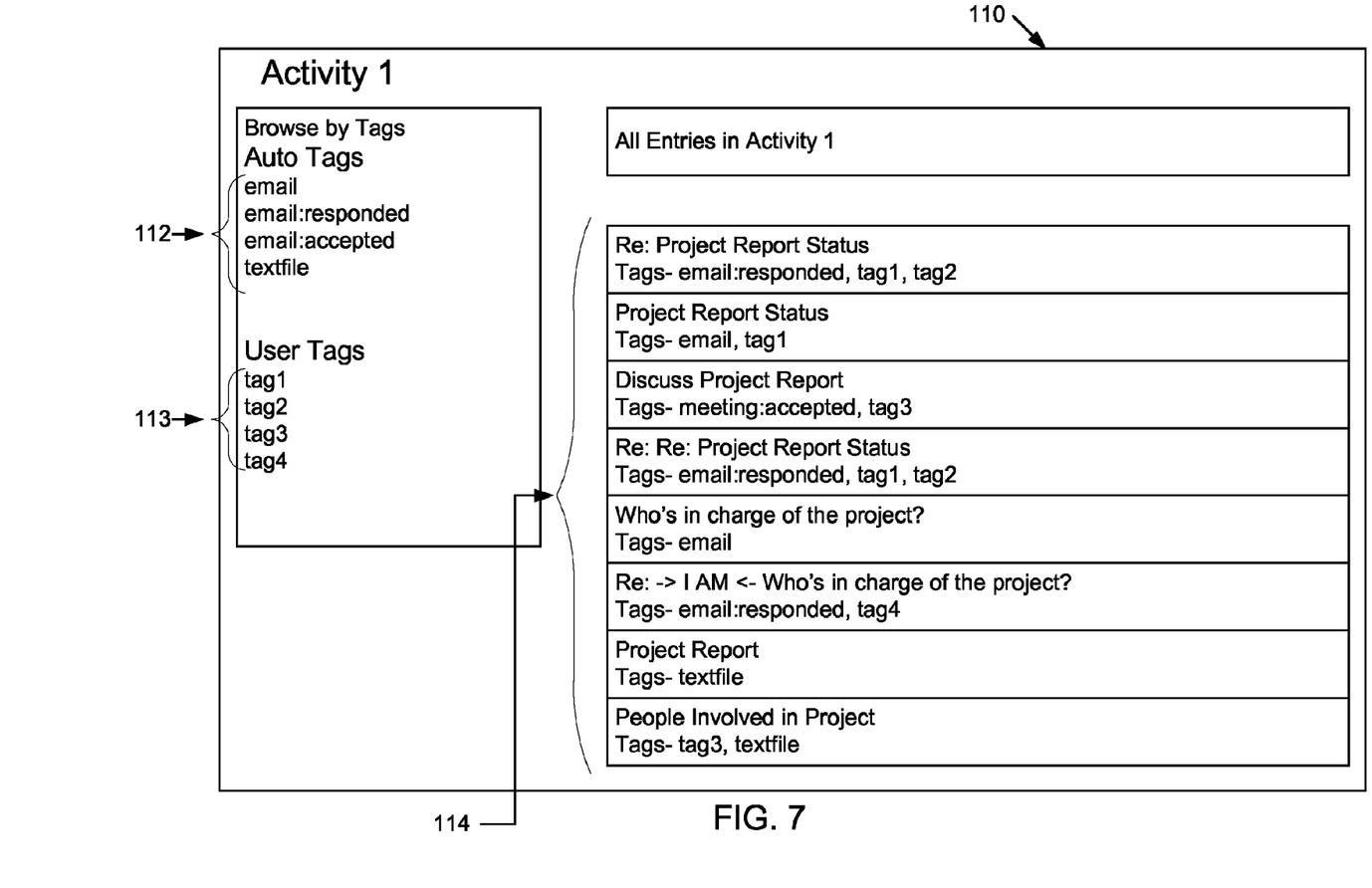
FIG. 7 is a simplified screen shot showing an example of an activity level user interface provided by an illustrative embodiment of the disclosed system.

FIG. 7 is a simplified screen shot showing an example of an activity level user interface 110 provided by an illustrative embodiment of the disclosed system for a currently open activity 111 ("Activity 1"). The currently open activity may, for example, have been selected by a user by checking a check box associated with that activity in the top level activities view user interface shown in FIGS. 5 and 6.

The activity level user interface 110 of FIG. 7 is shown including a list 12 of all content type tags associated with content items contained in the currently open activity 111. A list of user defined tags 113 is also shown in the activity level user interface 110 containing those user defined tags that are associated with content items contained in the currently open activity 111. A list of content items 114 displays the content items contained in the currently open activity 111. In the example of FIG. 7, each content item in the list 114 also includes a display of those content type tags and/or user defined tags that are associated with that content item.

Figure 8:
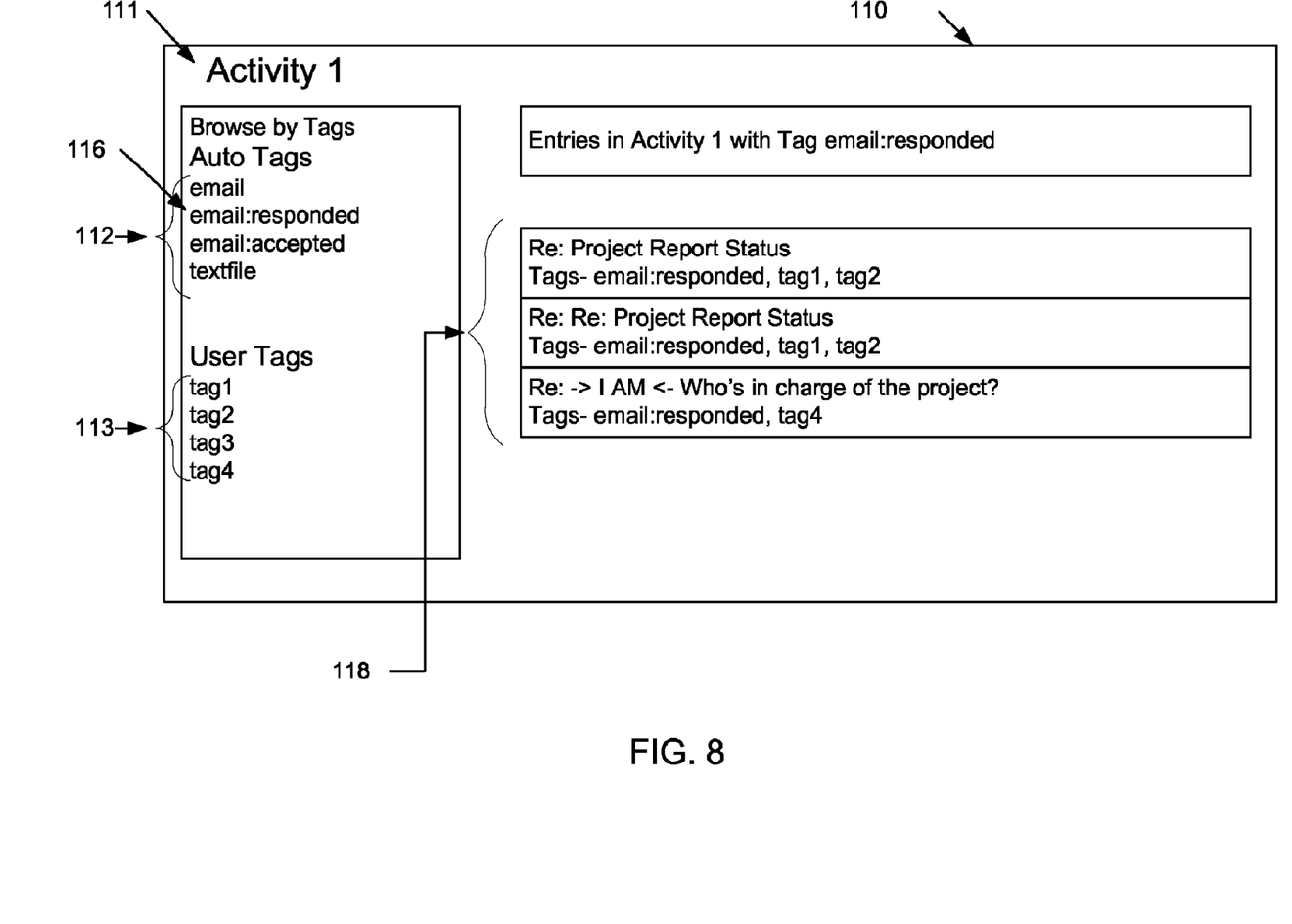
FIG. 8 is a simplified screen shot showing the activity level user interface of FIG. 7 after a user has selected a content type tag.

FIG. 8 is a simplified screen shot showing the activity level user interface 110 of FIG. 7 after a user has selected a content type tag "email:responded" 116 from the list 112. In response to the user selecting the content type tag "email:responded" 116 from the list 112, the disclosed system generates revised content item list 118 for the currently open activity, listing only those content items contained within the currently open activity that are associated with the selected content type tag "email:responded". In this way, the user has caused the disclosed system to list all the e-mail messages that have previously been responded to that are contained within the currently open activity.

The present invention can be realized in hardware, software, or a combination of hardware and software. A system according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable medium or memory that can direct a computer or other programmable data processing apparatus to function in a particular manner, such that the instructions stored in the computer-readable medium or memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method, embodied in at least one computer system, for automatic association by said computer system of tags with received content items based on type of communication and content state in an activities oriented collaboration tool, comprising:

receiving content items from a plurality of content sources at said activities oriented collaboration tool;

automatically associating content type tags with corresponding ones of said received content items, wherein each of said content type tags indicates a content source from which a corresponding one of said received content items was received, and further indicates a current state of said corresponding one of said received content items;

providing a top level content type tags view, wherein said top level content type tags view includes a list of content type tags automatically associated with received content items across all activities defined in said activities oriented collaboration tool, wherein said top level content type tags view enables a user to select individual content type tags from said list of content type tags automatically associated with received content items across all said activities defined in said activities oriented collaboration tool; and responsive to said user selecting one of said content type tags in said list of content type tags automatically associated with received content items across all activities defined in said activities oriented collaboration tool, displaying a list of those activities defined in said activities oriented collaboration tool that contain at least one received content item with which said user selected content type tag was previously automatically associated.

2. The method of claim 1, further comprising:

wherein said top level content type tags view additionally includes a separate list of user defined content type tags associated with received content items by said user.

3. The method of claim 2, further comprising:

providing an activity level content type tags view, wherein said activity level content type tags view lists all automatically generated content type tags associated with received content items contained in a currently opened activity.

4. The method of claim 3, further comprising:

wherein said activity level content type tags view enables said user to select from said content type tags available within said currently opened activity; and responsive to said user selecting one of said content type tags available within said currently opened activity, displaying all said received content items within the currently opened activity that are associated with the selected content type tag.

5. The method of claim 4, further comprising:
wherein said content sources include an electronic mail system, an instant messaging system, a calendar event scheduling system, a file system, a voice mail system, and a telephone conversation recording system; and
wherein said received content items include electronic mail messages, instant messaging session transcripts, calendar event invitations, files, voice mail messages, and recorded telephone conversations.

6. The method of claim 5, further comprising:
wherein said state changes include one of the set consisting of said user responding to an electronic mail message, said user responding to a calendar event invitation, said user modifying a file, and said user listening to a voice mail message.

7. The method of claim 1, further comprising:
automatically updating each of said content type tags to indicate state changes in their corresponding received content items.

8. A system including at least one processor and at least one computer readable memory, said computer readable memory having stored thereon program code for automatic association of tags with received content items based on type of communication and content state in an activities oriented collaboration tool, said program code comprising:
program code for receiving content items from a plurality of content sources at said activities oriented collaboration tool;
program code for automatically associating content type tags with corresponding ones of said received content items, wherein each of said content type tags indicates a content source from which a corresponding one of said received content items was received, and further indicates a current state of said corresponding one of said received content items;
program code for providing a top level content type tags view, wherein said top level content type tags view includes a list of content type tags automatically associated with received content items across all activities defined in said activities oriented collaboration tool, wherein said top level content type tags view enables a user to select individual content type tags from said list of content type tags automatically associated with received content items across all said activities defined in said activities oriented collaboration tool; and
program for displaying, responsive to said user selecting one of said content type tags in said list of content type tags automatically associated with received content items across all activities defined in said activities oriented collaboration tool, a list of those activities defined in said activities oriented collaboration tool that contain at least one received content item with which said user selected content type tag was previously automatically associated.

9. The system of claim 8, said program code further comprising:
wherein said top level content type tags view additionally includes a separate list of user defined content type tags associated with received content items by said user.

10. The system of claim 9, said program code further comprising:
program code for providing an activity level content type tags view, wherein said activity level content type tags view lists all automatically generated content type tags associated with received content items contained in a currently opened activity.

11. The system of claim 10, said program code further comprising:
wherein said activity level content type tags view enables said user to select from said content type tags available within said currently opened activity; and
program code for, responsive to said user selecting one of said content type tags available within said currently opened activity, displaying all said received content items within the currently opened activity that are associated with the selected content type tag.

12. The system of claim 11, further comprising:
wherein said content sources include an electronic mail system, an instant messaging system, a calendar event scheduling system, a file system, a voice mail system, and a telephone conversation recording system; and
wherein said received content items include electronic mail messages, instant messaging session transcripts, calendar event invitations, files, voice mail messages, and recorded telephone conversations.

13. The system of claim 12, further comprising:
wherein said state changes include one of the set consisting of said user responding to an electronic mail message, said user responding to a calendar event invitation, said user modifying a file, and said user listening to a voice mail message.

14. The system of claim 8, further comprising:
program code for automatically updating each of said content type tags to indicate state changes in their corresponding received content items.

15. A computer program product including a physical computer readable storage medium, said physical computer readable storage medium having program code stored thereon for automatic association of tags with received content items based on type of communication and content state in an activities oriented collaboration tool, said program code comprising:
program code for receiving content items from a plurality of content sources at said activities oriented collaboration tool;
program code for automatically associating content type tags with corresponding ones of said received content items, wherein each of said content type tags indicates a content source from which a corresponding one of said received content items was received, and further indicates a current state of said corresponding one of said received content items;
program code for providing a top level content type tags view, wherein said top level content type tags view includes a list of content type tags automatically associated with received content items across all activities defined in said activities oriented collaboration tool, wherein said top level content type tags view enables a user to select individual content type tags from said list of content type tags automatically associated with received content items across all said activities defined in said activities oriented collaboration tool; and
program for displaying, responsive to said user selecting one of said content type tags in said list of content type tags automatically associated with received content items across all activities defined in said activities oriented collaboration tool, a list of those activities defined in said activities oriented collaboration tool that contain at least one received content item with which said user selected content type tag was previously automatically associated.

* * * * *